(12) United States Patent
Qiu

(10) Patent No.: US 11,252,165 B2
(45) Date of Patent: Feb. 15, 2022

(54) CROSS-CHAIN DATA TRUSTED MANAGEMENT METHODS AND APPARATUSES

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/163,291

(22) Filed: Jan. 29, 2021

(65) Prior Publication Data

US 2021/0258323 A1    Aug. 19, 2021

Related U.S. Application Data

(63) Continuation of application No. PCT/CN2019/106620, filed on Sep. 19, 2019.

(30) Foreign Application Priority Data

Nov. 16, 2018 (CN) .......................... 201811364462.6

(51) Int. Cl.
*H04L 29/06* (2006.01)
*H04L 9/30* (2006.01)

(52) U.S. Cl.
CPC .............. *H04L 63/123* (2013.01); *H04L 9/30* (2013.01)

(58) Field of Classification Search
CPC ................................ H04L 63/123; H04L 9/30
See application file for complete search history.

(56) References Cited

U.S. PATENT DOCUMENTS 10,824,746 B1* 11/2020 Magerkurth ....... G06Q 20/3825
2016/0357550 A1* 12/2016 Thomas .................... G06F 8/77
(Continued)

FOREIGN PATENT DOCUMENTS

CN    106960388    7/2017
CN    107464148    12/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Taghi T Arani
*Assistant Examiner* — Lin Chang
(74) *Attorney, Agent, or Firm* — Fish & Richardson P.C.

(57) ABSTRACT

Disclosed herein are methods, systems, and apparatus, including computer programs encoded on computer storage media, for implementing cross-chain data trusted management. One of the computer-implemented methods includes obtaining cross-chain data by a relay from a second blockchain based on a cross-chain request that is from a first blockchain, where a trusted execution environment (TEE) is loaded onto the relay. The relay obtains processed data by loading a preconfigured management rule set to process the cross-chain data based on a management rule comprised in the preconfigured management rule set. A response result is returned by the relay, where the response result includes an identity signature of the relay and the processed data.

20 Claims, 7 Drawing Sheets

(56) References Cited

U.S. PATENT DOCUMENTS

| | | | | |
|---|---|---|---|---|
| 2017/0352027 | A1* | 12/2017 | Zhang | G06Q 20/065 |
| 2018/0048461 | A1 | 2/2018 | Jutla et al. | |
| 2018/0139056 | A1 | 5/2018 | Imai et al. | |
| 2018/0248701 | A1* | 8/2018 | Johnson | H04L 9/3236 |
| 2019/0340267 | A1* | 11/2019 | Vo | G06F 16/2365 |
| 2020/0026785 | A1* | 1/2020 | Patangia | H04L 63/123 |
| 2020/0034457 | A1* | 1/2020 | Brody | H04L 9/0819 |
| 2020/0118068 | A1* | 4/2020 | Turetsky | G06Q 20/06 |

FOREIGN PATENT DOCUMENTS

| | | |
|---|---|---|
| CN | 107800795 | 3/2018 |
| CN | 107888562 | 4/2018 |
| CN | 107909369 * | 4/2018 |
| CN | 108269190 | 7/2018 |
| CN | 108288159 | 7/2018 |
| CN | 110035045 | 7/2018 |
| CN | 108418795 | 8/2018 |
| CN | 108492180 | 9/2018 |
| CN | 108604832 | 9/2018 |
| CN | 108683630 | 10/2018 |
| CN | 108694328 | 10/2018 |
| CN | 108712257 | 10/2018 |
| CN | 108768659 | 11/2018 |
| TW | 201732706 | 9/2017 |
| WO | WO 2019145790 | 8/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2019/106620, dated Dec. 18, 2019, 10 pages (with partial English translation).

EP Extended Search Report in European Application No. 19885911.8, dated Sep. 1, 2021, 11 pages.

Ellis et al, "ChainLink: A Decentralized Oracle Network", ChainLink, Sep. 4, 2017, 38 pages.

* cited by examiner

CROSS-CHAIN DATA TRUSTED MANAGEMENT METHODS AND APPARATUSES

CROSS-REFERENCE TO RELATED APPLICATIONS

This application is a continuation of PCT Application No. PCT/CN2019/106620, filed on Sep. 19, 2019, which claims priority to Chinese Patent Application No. 201811364462.6, filed on Nov. 16, 2018, and each application is hereby incorporated by reference in its entirety.

TECHNICAL FIELD

One or more embodiments of the present specification relate to the field of blockchain technologies, and in particular, to cross-chain data trusted management methods and apparatuses, and electronic devices.

BACKGROUND

In related technologies, cross-chain data exchanges between different blockchains can be implemented by using a relay chain. The relay chain can be connected to each blockchain. Several validators provided on the relay chain verify cross-chain data on each blockchain by using consensus algorithms, and other blockchains can obtain the cross-chain data provided that the blockchains are connected to the relay chain.

SUMMARY

In view of this, one or more embodiments of the present specification provide cross-chain data trusted management methods and apparatuses, and electronic devices.

To achieve the above objective, the one or more embodiments of the present specification provide the following technical solutions:

According to a first aspect of the one or more embodiments of the present specification, a cross-chain data trusted management method is proposed. The method is applied to a relay, and a trusted execution environment (TEE) is loaded onto the relay so as to implement the following steps in the TEE: invoking, based on a cross-chain request from a first blockchain, corresponding cross-chain data from a second blockchain that serves as a requested object, where the relay is configured with a client device of the second blockchain; loading a preconfigured management rule set to manage the cross-chain data based on a management rule included in the management rule set to obtain processed data; and returning, to the first blockchain, a response result that includes an identity signature of the relay, where the response result includes the processed data.

According to a second aspect of the one or more embodiments of the present specification, a cross-chain data trusted management method is proposed. The method is applied to a blockchain node of a first blockchain and includes the following steps: creating a cross-chain request, where a requested object of the cross-chain request is a second blockchain so that a relay invokes corresponding cross-chain data from the second blockchain, where the relay is configured with a client device of the second blockchain; and obtaining a response result returned by the relay, where the response result is generated by the relay in a loaded TEE, the response result includes processed data, and the response result includes an identity signature of the relay.

According to a third aspect of the one or more embodiments of the present specification, a cross-chain data trusted management apparatus is proposed. The apparatus is applied to a relay, and a TEE is loaded onto the relay so as to implement the following units in the TEE: an invoking unit, configured to invoke, based on a cross-chain request from a first blockchain, corresponding cross-chain data from a second blockchain that serves as a requested object, where the relay is configured with a client device of the second blockchain; a management unit, configured to load a preconfigured management rule set to manage the cross-chain data based on a management rule included in the management rule set to obtain processed data; and a first returning unit, configured to return, to the first blockchain, a response result that includes an identity signature of the relay, where the response result includes the processed data.

According to a fourth aspect of the one or more embodiments of the present specification, a cross-chain data trusted management apparatus is proposed. The apparatus is applied to a blockchain node of a first blockchain and includes: a creation unit, configured to create a cross-chain request, where a requested object of the cross-chain request is a second blockchain so that a relay invokes corresponding cross-chain data from the second blockchain, where the relay is configured with a client device of the second blockchain; and an acquisition unit, configured to obtain a response result returned by the relay, where the response result is generated by the relay in a loaded TEE, the response result includes processed data, and the response result includes an identity signature of the relay.

According to a fifth aspect of the one or more embodiments of the present specification, an electronic device is proposed, including: a processor; and a memory configured to store a processor executable instruction, where the processor runs the executable instruction to implement the method according to the first aspect.

According to a sixth aspect of the one or more embodiments of the present specification, an electronic device is proposed, including: a processor; and a memory configured to store a processor executable instruction, where the processor runs the executable instruction to implement the method according to the second aspect.

DESCRIPTION OF EMBODIMENTS

Example embodiments are described in detail here, and examples of the example embodiments are presented in the accompanying drawings. When the following description relates to the accompanying drawings, unless specified otherwise, same numbers in different accompanying drawings represent same or similar elements. Implementations described in the following example embodiments do not represent all implementations consistent with one or more embodiments of the present specification. On the contrary, the implementations are only examples of apparatuses and methods that are described in the appended claims in detail and that are consistent with some aspects of one or more embodiments of the present specification.

It is worthwhile to note that in other embodiments, steps of a corresponding method do not necessarily need to be performed in a sequence illustrated and described in the present specification. Methods in some other embodiments can include more or fewer steps than the methods described in the present specification. In addition, a single step described in the present specification may be divided into multiple steps for description in other embodiments, and multiple steps described in the present specification may alternatively be combined into a single step for description in other embodiments.

Figure 1:
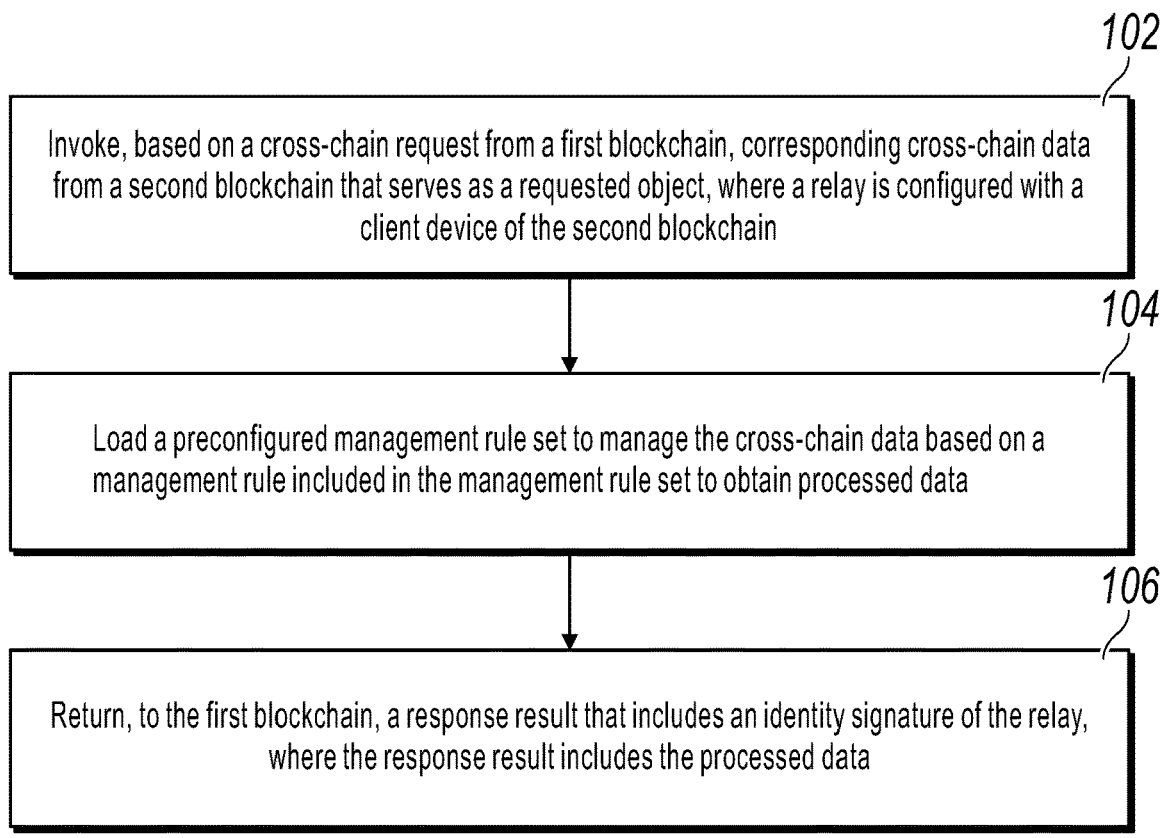
FIG. 1 is a flowchart illustrating a cross-chain data trusted management method, according to an example embodiment.

FIG. 1 is a flowchart illustrating a cross-chain data trusted management method, according to an example embodiment. As shown in FIG. 1, the method is applied to a relay, and a trusted execution environment (TEE) is loaded onto the relay so as to implement the following steps in the TEE:

Step 102. Invoke, based on a cross-chain request from a first blockchain, corresponding cross-chain data from a second blockchain that serves as a requested object, where the relay is configured with a client device of the second blockchain.

In some embodiments, the first blockchain serves as an invoking party and the second blockchain serves as an invoked party. The first blockchain is enabled to invoke blockchain data (that is, the cross-chain data) from the second blockchain through cross-chain data exchanges between the first blockchain and the second blockchain. More specifically, a certain blockchain node on the first blockchain can request for invoking the blockchain data from the second blockchain.

It can be easily understood that the "first blockchain" and the "second blockchain" are merely names of blockchains in different roles but do not specifically refer to certain one or more blockchains. For example, any blockchain that serves as an invoking party is the first blockchain, but when the any blockchain serves as an invoked party, the any blockchain is the second blockchain.

In some embodiments, the relay is configured with the client device of the second blockchain so that the relay can invoke the blockchain data on the second blockchain by using the client device and provide the blockchain data to the first blockchain, thereby completing cross-chain data exchanges. The client device configured on the relay can be a complete client. Or the client device configured on the relay can be a simplified payment verification (SPV) client device so as to implement a lightweight relay while completing data invoking.

In some embodiments, there can be one or more relays. It is unnecessary to install clients of all blockchains on each relay, and a client device of a corresponding blockchain is installed on the relay only when it is determined that the blockchain needs to implement cross-chain data exchanges by using the relay. It is conducive to implementing lightweight relays. In addition, multiple relays are used. As such, on the one hand, cross-chain data exchange needs of numerous blockchains can be distributed properly and restrictions imposed by the performance bottleneck of a single relay can be alleviated. On the other hand, elastic deployment of relays can be performed conveniently based on actual needs, featuring excellent scalability.

In some embodiments, a relay can be a public relay or a private relay. For a public relay, the second blockchain and other blockchains all have operation permission so that these blockchains share the relay. It is conducive to reducing the quantity of relays that need to be deployed and reducing the system complexity. For a private relay, only the second blockchain has operation permission and other blockchains have no operation permission and cannot use the relay. It can ensure that the cross-chain data invoked from the second blockchain is not obtained by other blockchains, thereby improving data privacy.

In some embodiments, a client device of the first blockchain can be installed on the relay so that the relay can monitor the cross-chain request created on the first blockchain. In some other embodiments, an anchor can be deployed, and a client device of the first blockchain is installed on the anchor so that the anchor can monitor the cross-chain request created on the first blockchain and provide the cross-chain request to the relay. In addition, the relay can provide a returned response result to the anchor and the anchor returns, to the response result, to the first blockchain. The previous client device of the first blockchain installed on the relay or the anchor can be a complete client device or an SPV client device. Implementations are not limited in the present specification.

In some embodiments, an anchor can be a public anchor or a private anchor. For a public anchor, the first blockchain and other blockchains all have operation permission so that these blockchains share the anchor. It is conducive to reducing the quantity of anchors that need to be deployed and reducing the system complexity. For a private anchor, only the first blockchain has operation permission and other blockchains have no operation permission and cannot use the anchor. It can ensure that the response result provided by the relay is not obtained by other blockchains, thereby improving data privacy.

Step 104. Load a preconfigured management rule set to manage the cross-chain data based on a management rule included in the management rule set to obtain processed data.

In some embodiments, the management rule set includes one or more management rules for content management of cross-chain data. The management rules can be provided by a management department, the management rules can be management regulations agreed upon by a blockchain member or between blockchain members, or the management rules can have other sources. Implementations are not limited in the present specification.

In some embodiments, when the cross-chain data is managed based on the management rule set, if the cross-chain data hits one or more management rules, the cross-chain data may need to be specifically adjusted based on the management rules, for example, by marking sensitive words, desensitizing sensitive content (for example, replacing the sensitive content with "*" or directly deleting the sensitive content), etc. The adjustment depends on the definitions of the management rules. Implementations are not limited in the present specification. Therefore, the processed data and the cross-chain data may be the same or may be different to a specific degree. It depends on a management rule hitting status and the content of the definitions of the management rules.

Step 106. Return, to the first blockchain, a response result that includes an identity signature of the relay, where the response result includes the processed data.

In some embodiments, the relay can support TEE technologies in related technologies, for example, Software Guard Extensions (SGX). Implementations are not limited in the present specification. The TEE can be loaded onto the relay by using the TEE technology. As such, when the relay loads the management rule set to manage the cross-chain data, interference or impact from malicious software can be prevented, thereby ensuring that the relay can faithfully manage the cross-chain data based on the predefined management rule set to obtain the previous processed data.

In some embodiments, the response result that includes the identity signature of the relay is returned to the first blockchain so that the first blockchain verifies the identity signature to determine that the corresponding response result is actually generated by the previous relay. In addition, the first blockchain can determine, in advance, the processing solution used by each relay, including whether the relay uses a TEE, etc. Therefore, the first blockchain can determine that the response result is generated by the corresponding relay in the TEE, thereby determining that the processed data included in the response result is obtained by the relay by managing the cross-chain data based on the predefined management rule set. In other words, the result of managing the cross-chain data by the relay is accurate and valid.

In some embodiments, the relay records a public and private key pair that uniquely matches the management rule set. The "uniquely matching" here is related to content of the management rule set but is not limited to the concept of "management rule set". In other words, when the management rule set in the relay is changed, for example, when a management rule is added to or deleted from the included management rules or modified, the relay needs to update the corresponding public and private key pair.

In some embodiments, information that uniquely corresponds to the content of all the management rules included in the management rule set can be generated based on all the management rules, and a unique matching relationship between the information and the public and private key pair is recorded. For example, a hash value can be formed, based on a preset algorithm, from hash values that respectively correspond to management rules in the management rule set, and the hash value serves as information about the management rule set. For example, the preset algorithm can be used to organize the hash values that respectively correspond to the management rules in the management rule set into a hash tree (Merkle tree or Merkle hash tree), and the information about the management rule set can be a root hash value of the hash tree.

In some embodiments, the response result can further include the information about the management rule set and a public key that uniquely matches the management rule set. As such, the first blockchain can determine, based on the information about the management rule set and the public key, a relationship between the processed data included in the response result and the management rule set, to ensure that the relay has managed the cross-chain data faithfully based on predefined management rules and has not tampered with the management rules included in the management rule set. For example, the first blockchain can send a verification request to the relay, where the verification request includes the public key provided in the response result. In a case, if the relay identifies information that is about the management rule set and that corresponds to the public key in the verification request, the relay can return the determined information about the management rule set to the first blockchain. Correspondingly, the first blockchain can determine, based on the received information about the management rule set, that the public key provided in the response result is actually provided by the relay. Then the first blockchain can compare the information that is about the management rule set and that is returned by the relay with the information that is about the management rule set and that is included in the response result. If the two pieces of information are consistent, it can be determined that the relay obtains the previous processed data by managing the cross-chain data based on the management rule set and has not tampered with the management rule set. If the two pieces of information are inconsistent, it indicates that the relay may have tampered with the management rule set and that the processed data in the response result cannot be trusted. In another case, if the relay cannot identify information that is about the management rule set and that corresponds to the public key, the relay can return a notification message indicating that the information is not identified. As such, the first blockchain determines that the public key is not provided by the relay. Therefore, the response result is abnormal, and the corresponding public key may be changed because the relay has tampered with the management rule set, indicating that the processed data in the response result cannot be trusted.

In some embodiments, the relay can receive a query request from the first blockchain, and return the management rule set when the query request includes the information about the management rule set. As such, a manager or other roles on the first blockchain can determine specific management rules used for management by the relay.

In some embodiments, after returning the response result to the first blockchain, the relay may update the management rule set based on a normal process. Consequently, the information about the management rule set and the public and private key pair that uniquely matches the information about the management rule set are changed. However, the relay can still keep the historical management rule set, the information about the historical management rule set, and the public and private key pair that uniquely matches the information about the historical management rule set. As such, when the first blockchain initiates the verification request or query request to the relay, the relay can return corresponding information or data to satisfy needs of the first blockchain so that the first blockchain does not erroneously consider that the processed data included in the response result cannot be trusted.

In some embodiments, the response result can further include a signature that is signed on the processed data by using the private key that uniquely matches the information about the management rule set, and the signature is used to verify data integrity of the processed data. For example, the first blockchain can verify the signature by using the public key (that is, the public key that uniquely matches the information about the management rule set) that is determined in advance or that is provided in the response result, to ensure the data integrity of the processed data and prevent the data from being lost or tampered with during the transmission process.

In some embodiments, the response result can further include information about a monitoring rule that the cross-chain data hits. As such, a manager or other roles on the first blockchain can determine the rule hitting status of the cross-chain data.

Figure 2:
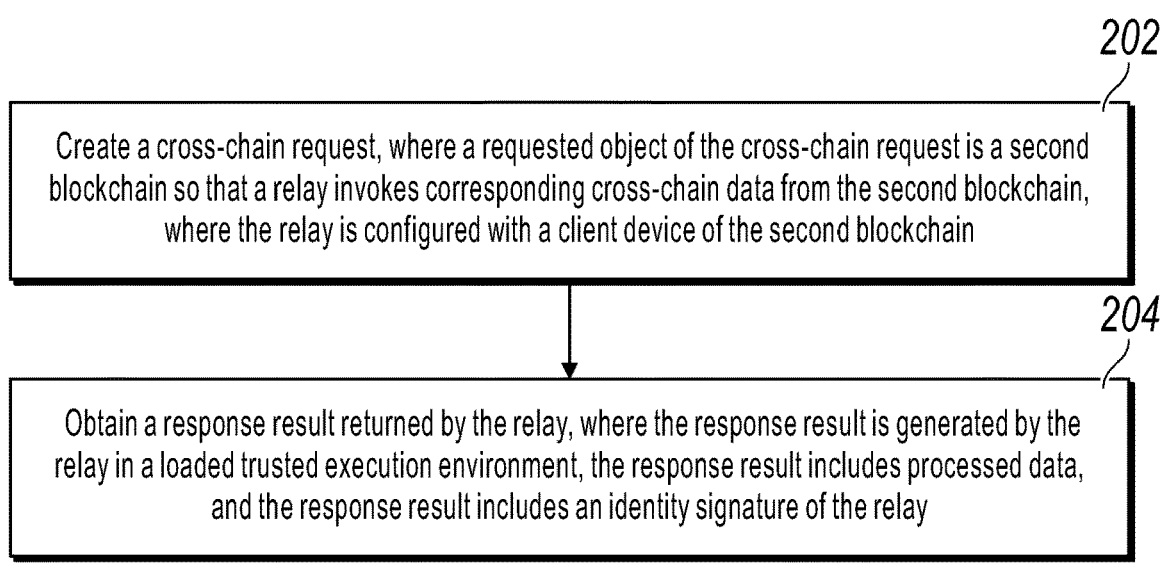
FIG. 2 is a flowchart illustrating another cross-chain data trusted management method, according to an example embodiment.

FIG. 2 is a flowchart illustrating another cross-chain data trusted management method, according to an example embodiment. As shown in FIG. 2, the method is applied to a blockchain node of a first blockchain and can include the following steps:

Step 202. Create a cross-chain request, where a requested object of the cross-chain request is a second blockchain so that a relay invokes corresponding cross-chain data from the second blockchain by using a configured client device of the second blockchain, and the relay is configured to manage the cross-chain data based on a management rule included in a management rule set to obtain processed data.

In some embodiments, the first blockchain serves as an invoking party and the second blockchain serves as an invoked party. The first blockchain is enabled to invoke blockchain data (that is, the cross-chain data) from the second blockchain through cross-chain data exchanges between the first blockchain and the second blockchain. More specifically, a certain blockchain node on the first blockchain can request for invoking the blockchain data from the second blockchain.

It can be easily understood that the "first blockchain" and the "second blockchain" are merely names of blockchains in different roles but do not specifically refer to certain one or more blockchains. For example, any blockchain that serves as an invoking party is the first blockchain, but when the any blockchain serves as an invoked party, the any blockchain is the second blockchain.

In some embodiments, the relay is configured with the client device of the second blockchain so that the relay can invoke the blockchain data on the second blockchain by using the client device and provide the blockchain data to the first blockchain, thereby completing cross-chain data exchanges. The client device configured on the relay can be a complete client. Or the client device configured on the relay can be an SPV client device so as to implement a lightweight relay while completing data invoking.

In some embodiments, a client device of the first blockchain can be installed on the relay so that the relay can monitor the cross-chain request created on the first blockchain. In some other embodiments, an anchor can be deployed, and a client device of the first blockchain is installed on the anchor so that the anchor can monitor the cross-chain request created on the first blockchain and provide the cross-chain request to the relay. In addition, the relay can provide a returned response result to the anchor and the anchor returns the response result to the first blockchain. The above client device of the first blockchain installed on the relay or the anchor can be a complete client device or an SPV client. Implementations are not limited in the present specification.

In some embodiments, an anchor can be a public anchor or a private anchor. For a public anchor, the first blockchain and other blockchains all have operation permission so that these blockchains share the anchor. It is conducive to reducing the quantity of anchors that need to be deployed and reducing the system complexity. For a private anchor, only the first blockchain has operation permission and other blockchains have no operation permission and cannot use the anchor. It can ensure that the response result provided by the relay is not obtained by other blockchains, thereby improving data privacy.

In some embodiments, the management rule set includes one or more management rules for content management of cross-chain data. The management rules can be provided by a management department, the management rules can be management regulations agreed upon by a blockchain member or between blockchain members, or the management rules can have other sources. Implementations are not limited in the present specification.

In some embodiments, when the cross-chain data is managed based on the management rule set, if the cross-chain data hits one or more management rules, the cross-chain data may need to be specifically adjusted based on the management rules, for example, by marking sensitive words, desensitizing sensitive content (for example, replacing the sensitive content with "*" or directly deleting the sensitive content), etc. The adjustment depends on the definitions of the management rules. Implementations are not limited in the present specification. Therefore, the processed data and the cross-chain data may be the same or may be different to a specific degree. It depends on a management rule hitting status and the content of the definitions of the management rules.

Step 204. Obtain a response result returned by the relay, where the response result is generated by the relay in a TEE, the response result includes the processed data, and the response result includes an identity signature of the relay.

In some embodiments, the relay can support TEE technologies in related technologies, for example, SGX. Implementations are not limited in the present specification. The TEE can be loaded onto the relay by using the TEE technology. As such, when the relay loads the management rule set to manage the cross-chain data, interference or impact from malicious software can be prevented, thereby ensuring that the relay can faithfully manage the cross-chain data based on the predefined management rule set to obtain the previous processed data.

In some embodiments, the response result that includes the identity signature of the relay is returned to the first blockchain so that the first blockchain verifies the identity signature to determine that the corresponding response result is actually generated by the previous relay. In addition, the first blockchain can determine, in advance, the processing solution used by each relay, including whether the relay uses a TEE, etc. Therefore, the first blockchain can determine that the response result is generated by the corresponding relay in the TEE, thereby determining that the processed data included in the response result is obtained by the relay by managing the cross-chain data based on the predefined management rule set. In other words, the result of managing the cross-chain data by the relay is accurate and valid.

In some embodiments, the relay records a public and private key pair that uniquely matches the management rule set. The "uniquely matching" here is related to content of the management rule set but is not limited to the concept of "management rule set". In other words, when the management rule set in the relay is changed, for example, when a management rule is added to or deleted from the included management rules or modified, the relay needs to update the corresponding public and private key pair.

In some embodiments, information that uniquely corresponds to the content of all the management rules included in the management rule set can be generated based on all the management rules, and a unique matching relationship between the information and the public and private key pair is recorded. For example, a hash value can be formed, based on a preset algorithm, from hash values that respectively correspond to management rules in the management rule set, and the hash value serves as information about the management rule set. For example, the preset algorithm can be used to organize the hash values that respectively correspond to the management rules in the management rule set into a hash tree, and the information about the management rule set can be a root hash value of the hash tree.

In some embodiments, the response result can further include the information about the management rule set and a public key that uniquely matches the management rule set. As such, the first blockchain can determine, based on the information about the management rule set and the public key, a relationship between the processed data included in the response result and the management rule set, to ensure that the relay has managed the cross-chain data faithfully based on predefined management rules and has not tampered with the management rules included in the management rule set. For example, the first blockchain can send a verification request to the relay, where the verification request includes the public key provided in the response result. In a case, if the relay identifies information that is about the management rule set and that corresponds to the public key in the verification request, the relay can return the determined information about the management rule set to the first blockchain. Correspondingly, the first blockchain can determine, based on the received information about the management rule set, that the public key provided in the response result is actually provided by the relay. Then the first blockchain can compare the information that is about the management rule set and that is returned by the relay with the information that is about the management rule set and that is included in the response result. If the two pieces of information are consistent, it can be determined that the relay obtains the previous processed data by managing the cross-chain data based on the management rule set and has not tampered with the management rule set. If the two pieces of information are inconsistent, it indicates that the relay may have tampered with the management rule set and that the processed data in the response result cannot be trusted. In another case, if the relay cannot identify information that is about the management rule set and that corresponds to the public key, the relay can return a notification message indicating that the information is not identified. As such, the first blockchain determines that the public key is not provided by the relay. Therefore, the response result is abnormal, and the corresponding public key may be changed because the relay has tampered with the management rule set, indicating that the processed data in the response result cannot be trusted.

In some embodiments, the relay can receive a query request from the first blockchain, and return the management rule set when the query request includes the information about the management rule set. As such, a manager or other roles on the first blockchain can determine specific management rules used for management by the relay.

In some embodiments, after returning the response result to the first blockchain, the relay may update the management rule set based on a normal process. Consequently, the information about the management rule set and the public and private key pair that uniquely matches the information about the management rule set are changed. However, the relay can still keep the historical management rule set, the information about the historical management rule set, and the public and private key pair that uniquely matches the information about the historical management rule set. As such, when the first blockchain initiates the verification request or query request to the relay, the relay can return corresponding information or data to satisfy needs of the first blockchain so that the first blockchain does not erroneously consider that the processed data included in the response result cannot be trusted.

In some embodiments, the response result can further include a signature that is signed on the processed data by using the private key that uniquely matches the information about the management rule set, and the signature is used to verify data integrity of the processed data. For example, the first blockchain can verify the signature by using the public key (that is, the public key that uniquely matches the information about the management rule set) that is determined in advance or that is provided in the response result, to ensure the data integrity of the processed data and prevent the data from being lost or tampered with during the transmission process.

In some embodiments, the response result can further include information about a monitoring rule that the cross-chain data hits. As such, a manager or other roles on the first blockchain can determine the rule hitting status of the cross-chain data.

Figure 3:
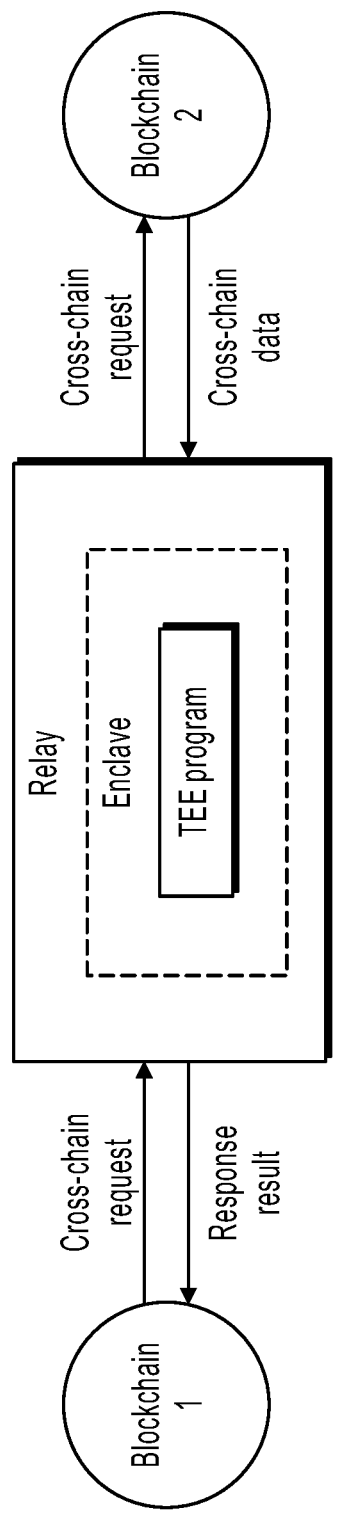
FIG. 3 is a schematic diagram illustrating an implementation of cross-chain data exchanges, according to an example embodiment.

For ease of understanding, a relay that uses the TEE technology is used as an example to describe the cross-chain data management solutions in the present specification. FIG. 3 is a schematic diagram illustrating an implementation of cross-chain data exchanges, according to an example embodiment. As shown in FIG. 3, cross-chain data exchanges between blockchain 1 and blockchain 2 can be implemented by using a relay. Blockchain 1 can initiate a cross-chain request to blockchain 2, and the relay can transmit the cross-chain request to blockchain 2 so that blockchain 2 generates corresponding cross-chain data based the cross-chain request. The relay is configured with a client device of blockchain 2. As such, the relay can invoke the cross-chain data generated by blockchain 2, manage the cross-chain data, and return a corresponding response result to blockchain 1.

In some embodiments, the relay can support the TEE technology so that a program that is run by the relay and that is used to implement the previous management processing can be configured as a TEE program. The TEE program can run securely in the TEE loaded onto the relay and is protected against impact such as malicious software. The SGX technology in related technologies is used as an example. When discovering that the program that needs to be executed is the TEE program, the CPU of the relay can read a key from a preconfigured security element to encrypt allocated memory space. The memory space can form a TEE, that is, the enclave space shown in FIG. 3, for executing the previous TEE program.

The TEE program is encapsulated in the enclave space, and only the CPU can obtain a key (that is, the key in the previous security element) to the enclave. As such, the security boundary of the enclave includes only the CPU and the TEE program, thereby preventing attacks from malicious software. Moreover, the enclave cannot be affected regardless of whether the malicious software is privileged software or even the operating system and the virtual machine monitor (VMM). Therefore, the relay is immune external factors during management of the cross-chain data.

Figure 4:
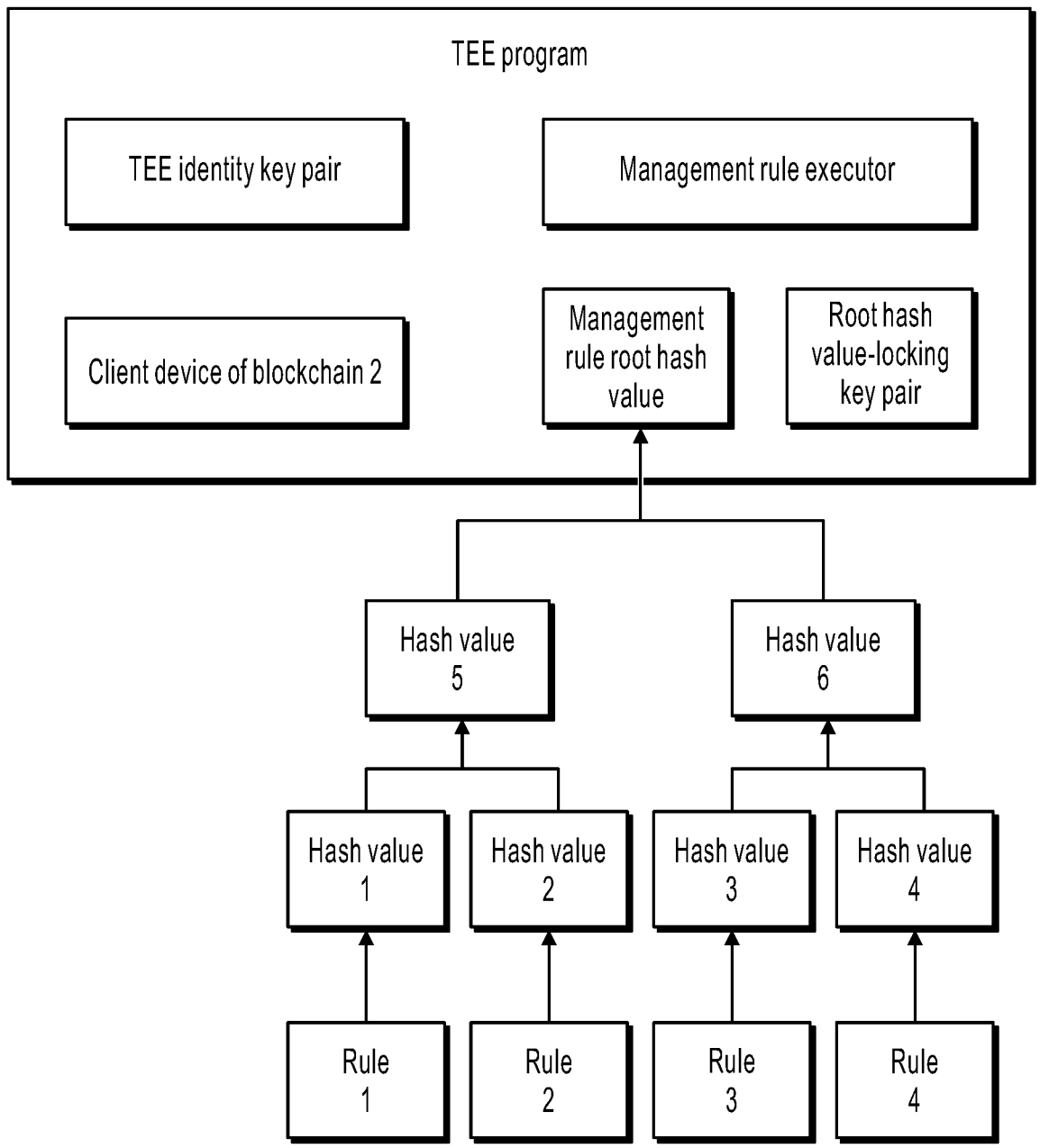
FIG. 4 is a schematic diagram illustrating the functional architecture of a TEE program, according to an example embodiment.

FIG. 4 is a schematic diagram illustrating the functional architecture of a TEE program, according to an example embodiment. As shown in FIG. 4, the TEE program can include several functional modules such as a TEE identity key pair, a client device of blockchain 2, a root hash value of management rules, a management rule executor, and a root hash value-locking key pair, for a relay to implement related processing functions.

In some embodiments, the client device of blockchain 2 can be an SPV client device of blockchain 2. The relay can invoke the foregoing cross-chain data from blockchain 2 based on the client device of blockchain 2. Details are omitted here for simplicity. Then the relay can load predefined management rules, for example, management rules 1 to 4 shown in FIG. 4, by using the management rule executor to manage the cross-chain data to obtain processed data. Management processing on the cross-chain data may vary according to the content of the management rules. For example, a certain management rule can be used to desensitize some sensitive words in the cross-chain data (for example, deleting the sensitive words or replacing the sensitive words with "*", another management rule can be used to mark other sensitive words in the cross-chain data, etc. Implementations are not limited in the present specification. Certainly, the cross-chain data may not hit any management rule. Therefore, the processed data is consistent with the cross-chain data.

In some embodiments, corresponding hash values, for example, hash value 1 to hash value 4, can be generated from rules 1 to 4 in the relay and further organized into the Merkle tree form shown in FIG. 4, to finally obtain a root hash. (For example, a hash operation is performed on hash value 1 and hash value 2 to obtain hash value 5, a hash operation is performed on hash value 3 and hash value 4 to obtain hash value 6, and a hash operation is further performed on hash value 5 and hash value 6 to obtain the root hash.) The management rule executor can invoke corresponding rules 1 to 4 in the relay (that is, management rules corresponding to all the leaf hash values in the Merkle tree that correspond to the root hash) based on the root hash and the previous Merkle tree, to manage the cross-chain data.

The previous root hash uniquely corresponds to the content of the management rules because of the characteristics of hash values. In other words, the corresponding root hash value remains unchanged when the management rules used by the TEE program are not changed, and the corresponding root hash also changes when any management rule is changed. The "root hash value-locking key pair" uniquely matches the "root hash". As such, the root hash and the root hash value-locking key pair also remain unchanged when the management rules used by the TEE program are not changed, and the corresponding root hash and the root hash value-locking key pair both change when any management rule is changed. For example, when determining that the root hash value is changed, the relay can regenerate a key pair and configure the key pair as a root hash value-locking key pair of the new root hash.

In some embodiments, the TEE program can generate, based on the above content, a response result to be returned by the relay to blockchain 1. The response result can include the following content: i. the processed data; ii. a signature that is signed on the processed data by using a root hash value-locking private key; iii. a root hash value-locking public key; iv. the root hash value of the management rules; and v. management rules that the cross-chain data hits Moreover, the TEE program can sign the response result by using the private key in the previous TEE identity key pair, and the signed response result is returned to blockchain 1 by the relay.

Correspondingly, blockchain 1 can verify the received response result to determine whether the processed data included in the response result is reliable, for example, whether the processed data is actually obtained by processing the cross-chain data based on the management rules. For example, the process of verifying the response result by blockchain 1 can include the following steps:

I. Blockchain 1 verifies the signature in the response result based on the TEE identity public key of the relay to determine that the response result is actually from the relay.

The TEE identity public key can be published externally or to blockchain 1 by the relay in advance. Blockchain 1 can determine a TEE technology supporting status of the relay in advance. Therefore, when determining that the response result is from the relay, blockchain 1 can determine that the response result is obtained by the relay through processing in the TEE, thereby protecting the response result against unfavorable impact from external factors such as malicious software.

II. Blockchain 1 reads the processed data, the root hash value-locking public key, and the signature that is signed on the processed data by using the root hash value-locking private key, which are included in the response result; and verifies, by using the root hash value-locking public key, the signature that is signed on the processed data by using the root hash value-locking private key. If the verification is passed, it can be determined that the processed data is not lost or tampered with during the transmission process, thereby determining the integrity of the processed data.

III. Blockchain 1 initiates a verification request to the relay, where the verification request includes the root hash value-locking public key provided in the response result.

After receiving the verification request, if the relay identifies management rule root hash value HashX that corresponds to the root hash value-locking public key, the relay can return the identified management rule root hash value HashX to blockchain 1. Correspondingly, when receiving management rule root hash value HashX returned by the relay, blockchain 1 can at least determine that the root hash value-locking public key provided in the response result is actually from the relay and determine that the management rule root hash value locked by the root hash value-locking public key is HashX. On the contrary, if the relay fails to identify a management rule root hash value that corresponds to the root hash value-locking public key in the verification request, the relay cannot return a corresponding management rule root hash value, and can return, for example, content such as "corresponding information not identified". As such, blockchain 1 determines that the root hash value-locking public key provided in the response result is not from the relay, thereby deducing that the processed data in the response result is highly probably unreliable.

Further, blockchain 1 can compare the obtained HashX with the management rule root hash value included in the response result. When the two are consistent, blockchain 1 can determine that the relay has run the TEE program to faithfully execute the management rules (for example, rule 1 to 4) corresponding to the management rule root hash and has not tampered with the management rules. When the two are inconsistent, it is indicates that the relay has highly probably tampered with the used management rules, and blockchain 1 can deduce that the processed data in the response result is highly probably unreliable.

In addition, blockchain 1 can further send the management rule root hash value to the relay. As such, the relay can return all the corresponding management rules to blockchain 1 so that blockchain 1 conveniently determines the management rules for managing the cross-chain data. Blockchain 1 can further determine a management rule hitting status of the cross-chain data based on management rules that the cross-chain data included in the response result hits.

In summary, the relay that is based on the TEE technology is used. The relay can provide a secure and reliable TEE to ensure that processing operations performed in the TEE is immune to external factors such as malicious software. In addition, the relay is logically a single-point device and therefore can efficiently and securely perform management processing, thereby effectively managing cross-chain data in cross-chain data exchange processes. Moreover, the response result includes other attestation information described above so that blockchain 1 can determine the relationship between the processed data and the cross-chain data, thereby effectively monitoring the relay. As such, it is difficult for the relay to tamper with the management rules, or blockchain 1 or third-party managers can discover tampering actions, thereby implementing cross-chain data trusted management solutions.

Figure 5:
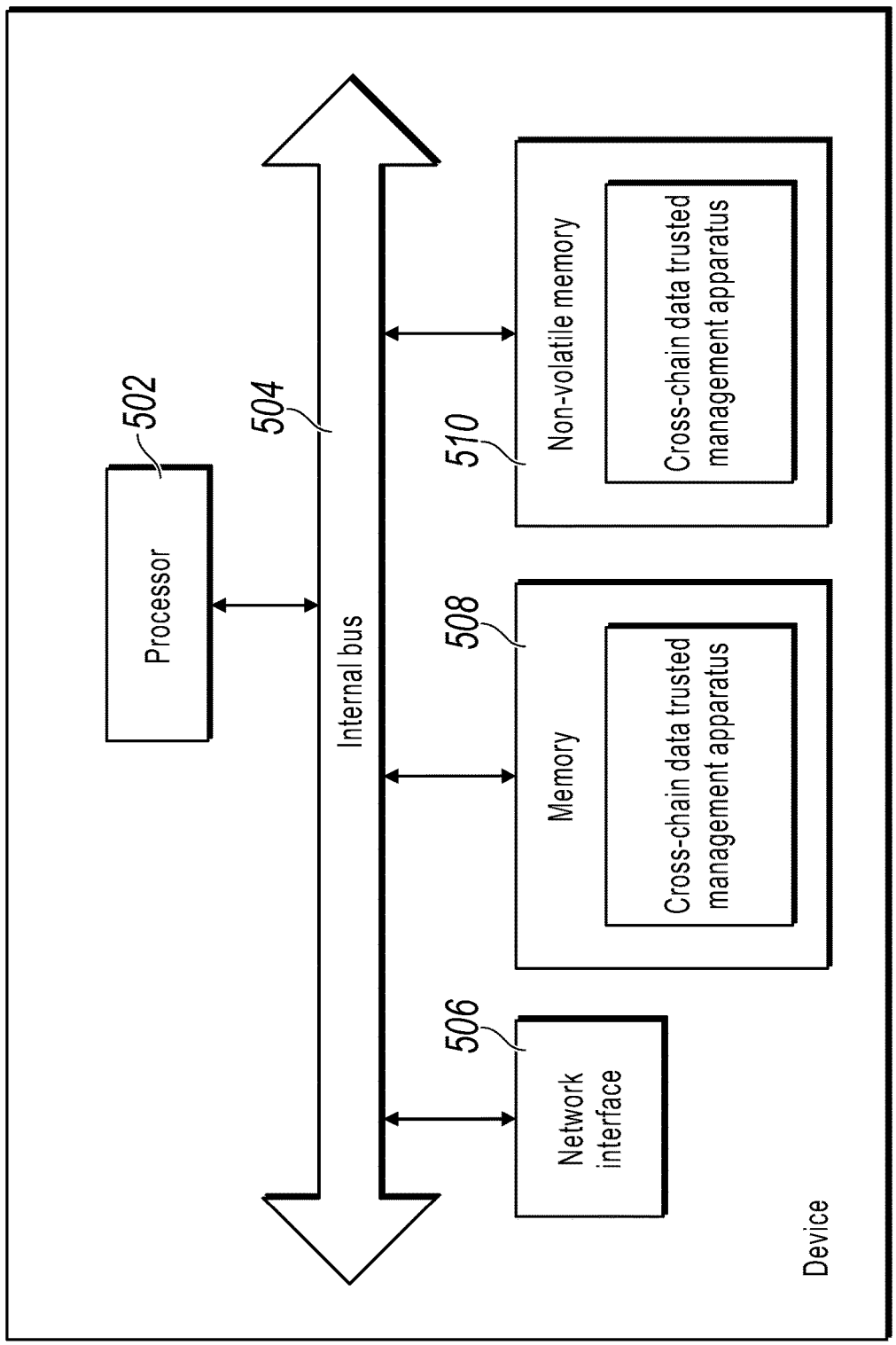
FIG. 5 is schematic structural diagram illustrating a device, according to an example embodiment.

FIG. 5 is schematic structural diagram illustrating a device, according to an example embodiment. Referring to FIG. 5, in terms of hardware, the device includes a processor 502, an internal bus 504, a network interface 506, a memory 508, and a nonvolatile memory 510, and certainly may further include hardware needed by other services. The processor 502 reads a corresponding computer program from the nonvolatile memory 510 to the memory 508 and then runs the computer program to form a logical cross-chain data trusted management apparatus. Certainly, in addition to the software implementation, one or more embodiments of the present specification do not exclude other implementations, for example, logical components or a combination of software and hardware. In other words, the execution bodies of the following processing procedures are not limited to the logical units and may be hardware or logical components.

Figure 6:
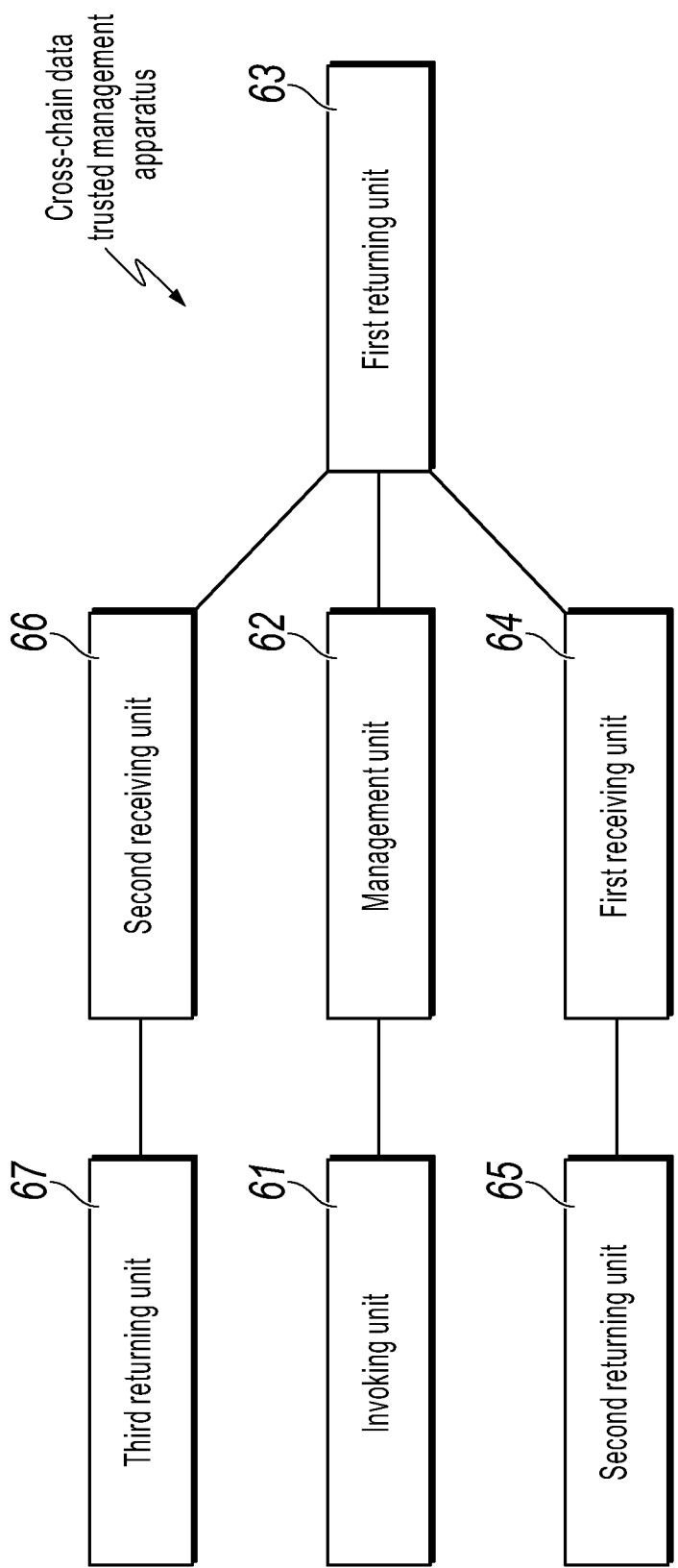
FIG. 6 is a block diagram illustrating a cross-chain data trusted management apparatus, according to an example embodiment.

Referring to FIG. 6, in a software implementation, the cross-chain data trusted management apparatus is applied to a relay, where a TEE is loaded onto the relay so as to implement the following units in the TEE: an invoking unit 61, configured to invoke, based on a cross-chain request from a first blockchain, corresponding cross-chain data from a second blockchain that serves as a requested object, where the relay is configured with a client device of the second blockchain; a management unit 62, configured to load a preconfigured management rule set to manage the cross-chain data based on a management rule included in the management rule set to obtain processed data; and a first returning unit 63, configured to return, to the first blockchain, a response result that includes an identity signature of the relay, where the response result includes the processed data.

Optionally, the response result further includes information about the management rule set and a public key that uniquely matches the information about the management rule set, to prove that the processed data is obtained by managing the cross-chain data based on the management rule set.

Optionally, the apparatus further includes: a first receiving unit 64, configured to receive a verification request from the first blockchain; and a second returning unit 65, configured to return information about the management rule set when the verification request includes the public key that uniquely matches the management rule set, where the information is compared with the information that is about the management rule set and that is included in the response result.

Optionally, the apparatus further includes: a second receiving unit 66, configured to receive a query request from the first blockchain; and a third returning unit 67, configured to return the management rule set when the query request includes the information about the management rule set.

Optionally, the information about the management rule set includes a hash value formed, based on a preset algorithm, from hash values that respectively correspond to management rules in the management rule set.

Optionally, the preset algorithm is used to organize the hash values that respectively correspond to the management rules in the management rule set into a hash tree, where the information about the management rule set includes a root hash value of the hash tree.

Optionally, the response result further includes a signature that is signed on the processed data by using the private key that uniquely matches the information about the management rule set, and the signature is used to verify data integrity of the processed data.

Optionally, the response result further includes information about a monitoring rule that the cross-chain data hits.

Figure 7:
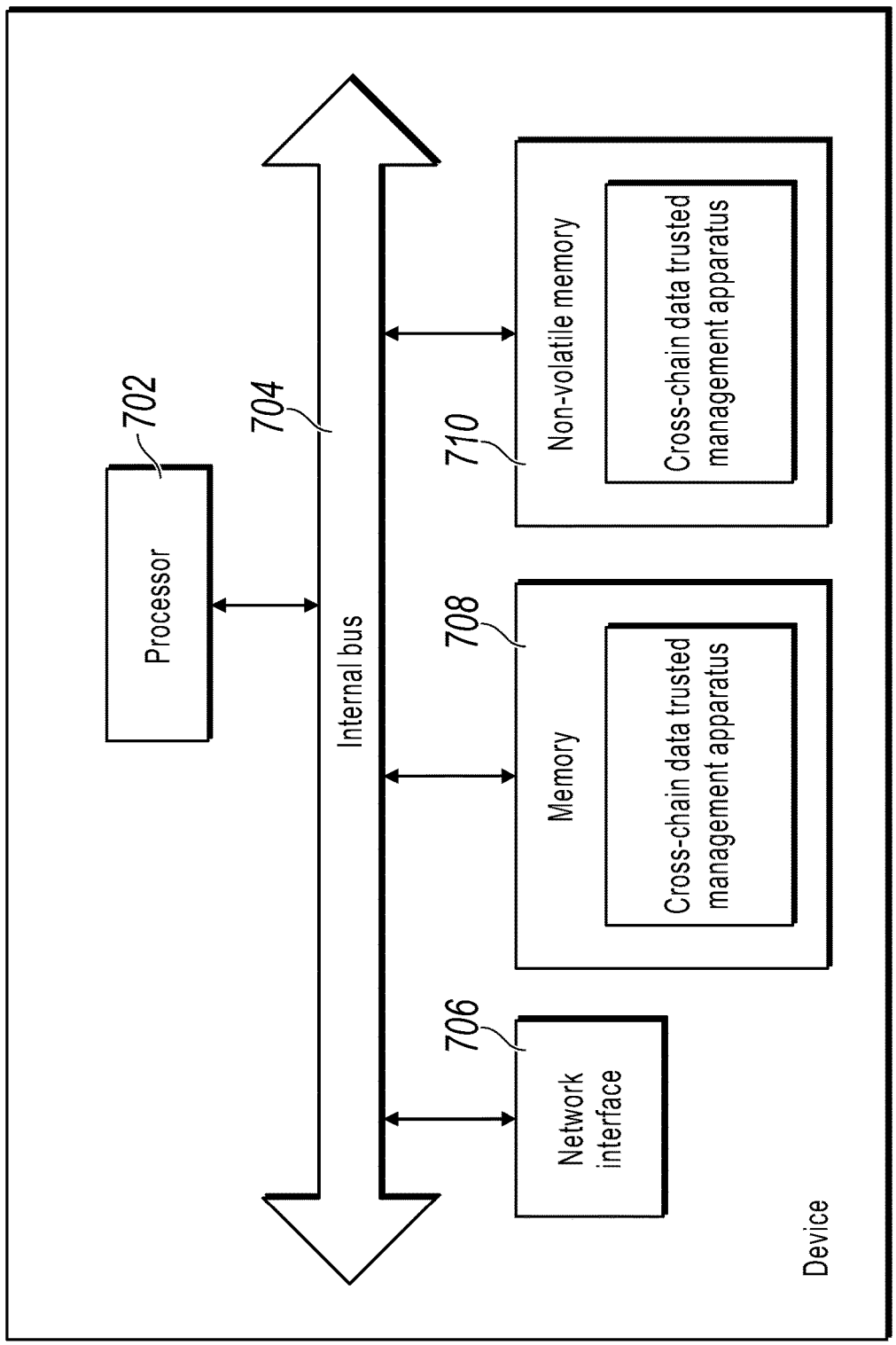
FIG. 7 is schematic structural diagram illustrating another device, according to an example embodiment.

FIG. 7 is schematic structural diagram illustrating a device, according to an example embodiment. Referring to FIG. 7, in terms of hardware, the device includes a processor 702, an internal bus 704, a network interface 706, a memory 708, and a nonvolatile memory 710, and certainly may further include hardware needed by other services. The processor 702 reads a corresponding computer program from the nonvolatile memory 710 to the memory 708 and then runs the computer program to form a logical cross-chain data trusted management apparatus. Certainly, in addition to the software implementation, one or more embodiments of the present specification do not exclude other implementations, for example, logical components or a combination of software and hardware. In other words, the execution bodies of the following processing procedures are not limited to the logical units and may be hardware or logical components.

Figure 8:
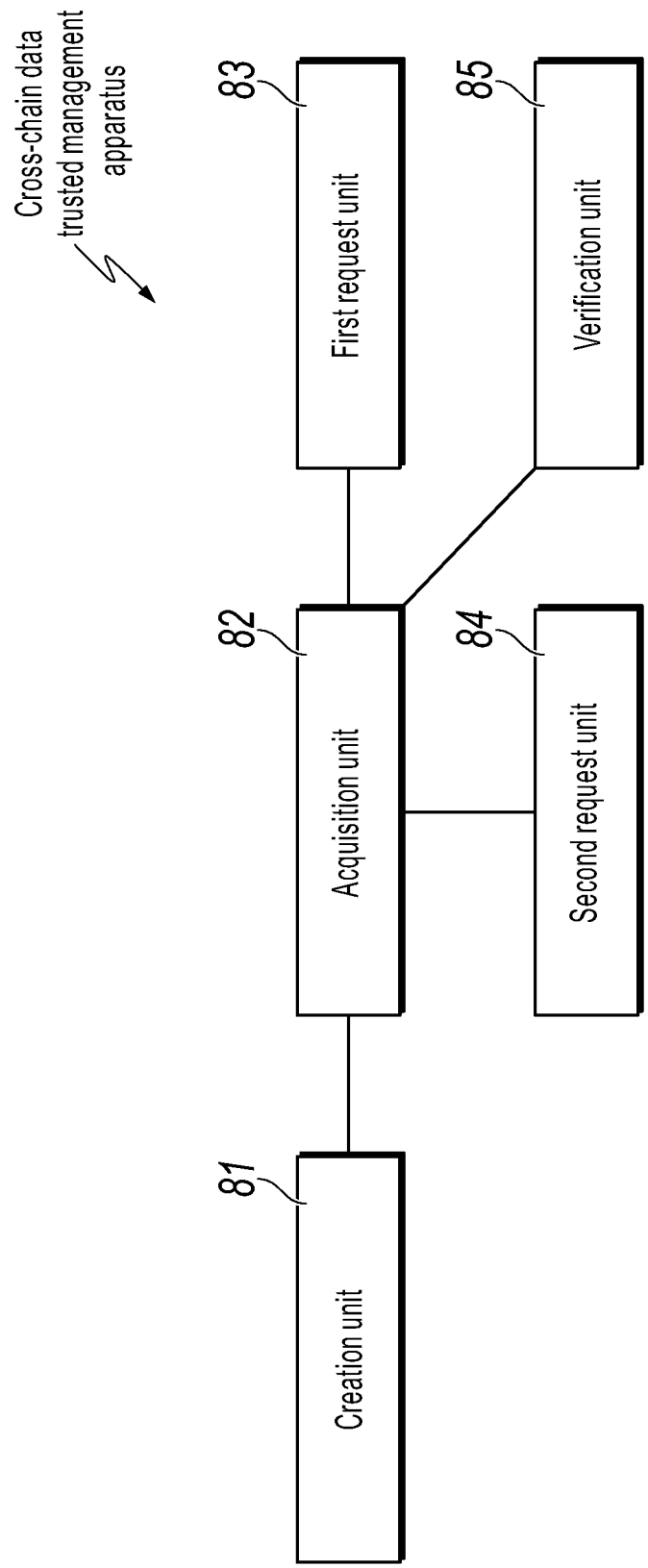
FIG. 8 is a block diagram illustrating another cross-chain data trusted management apparatus, according to an example embodiment.

Referring to FIG. 8, in a software implementation, the cross-chain data trusted management apparatus is applied to a blockchain node of a first blockchain and can include the following units: a creation unit 81, configured to create a cross-chain request, where a requested object of the cross-chain request is a second blockchain so that a relay invokes corresponding cross-chain data from the second blockchain by using a configured client device of the second blockchain, and the relay is configured to manage the cross-chain data based on a management rule included in a management rule set to obtain processed data; and an acquisition unit 82, configured to obtain a response result returned by the relay, where the response result is generated by the relay in a TEE, the response result includes the processed data, and the response result includes an identity signature of the relay.

Optionally, the response result further includes information about the management rule set and a public key that uniquely matches the management rule set, to indicate that the processed data is obtained by managing the cross-chain data based on the management rule set.

Optionally, the apparatus further includes: a first request unit 83, configured to initiate a verification request to the relay, where the verification request includes the public key provided in the response result, and when the relay returns information that is about the management rule set and that corresponds to the public key and the information is consistent with the information that is about the management rule set and that is included in the response result, it is determined that the public key included in the response result is from the relay and that the processed data is obtained by managing the cross-chain data based on the management rule set.

Optionally, the apparatus further includes: a second request unit 84, configured to initiate a query request to the relay to obtain the management rule set, where the query request includes the information about the management rule set.

Optionally, the response result further includes a signature that is signed on the processed data by using a private key that uniquely matches the management rule set, and the apparatus further includes: a verification unit 85, configured to verify the signature by using the public key included in the response result, to determine data integrity of the processed data included in the response result.

Optionally, the response result further includes information about a monitoring rule that the cross-chain data hits.

The system, apparatus, module, or unit illustrated in the previous embodiments can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

In a typical configuration, a computer includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change RAM (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD) or another optical storage, a cassette tape, a magnetic disk storage, a quantum memory, a storage medium based on grapheme, another magnetic storage device, or any other non-transmission medium. The computer storage medium can be used to store information that can be accessed by a computing device. Based on the definition in the present specification, the computer readable medium does not include transitory computer readable media such as a modulated data signal and carrier.

It is worthwhile to further note that, the terms "include", "contain", or their any other variants are intended to cover a non-exclusive inclusion, so a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or can be advantageous.

Terms used in one or more embodiments of the present specification are merely used to describe specific embodiments, and are not intended to limit the one or more embodiments of the present specification. The terms "a" and "the" of singular forms used in one or more embodiments of the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. can be used in one or more embodiments of the present specification to describe various types of information, the information is not limited to these terms. These terms are only used to differentiate between information of the same type. For example, without departing from the scope of one or more embodiments of the present specification, first information can also be referred to as second information, and similarly, the second information can also be referred to as the first information. Depending on the context, for example, the word "if" used here can be explained as "while", "when", or "in response to determining".

The previous descriptions are only example embodiments of one or more embodiments of the present specification, but are not intended to limit the one or more embodiments of the present specification. Any modification, equivalent replacement, improvement, etc. made without departing from the spirit and principle of the one or more embodiments of the present specification shall fall within the protection scope of the one or more embodiments of the present specification.

What is claimed is:

1. A computer-implemented method, comprising:
obtaining, by a relay and based on a cross-chain request that is from a first blockchain, cross-chain data from a second blockchain, wherein a trusted execution environment (TEE) is loaded onto the relay;
obtaining, by the relay, processed data by loading a preconfigured management rule set to process the cross-chain data based on one or more management rules comprised in the preconfigured management rule set;
generating, by the relay, a first root hash value based on the one or more management rules, the first root hash value uniquely corresponding to a root hash value-locking key pair, the root hash value-locking key pair comprising a root hash value-locking private key and a root hash value-locking public key;
generating, by the relay, a response result in response to the cross-chain request, the response result comprising the processed data, the first root hash value, the root hash value-locking public key, and a digital signature generated using the processed data and the root hash value-locking private key; and
returning, by the relay to the first blockchain, the response result.

2. The computer-implemented method of claim 1, wherein the response result indicates that the processed data is obtained by managing the cross-chain data based on the preconfigured management rule set.

3. The computer-implemented method of claim 2, further comprising:
receiving, by the relay, a verification request from the first blockchain; and
returning, by the relay, a second root hash value when the verification request comprises the root hash value-locking public key, wherein the second root hash value is compared with the first root hash value that is comprised in the response result.

4. The computer-implemented method of claim 2, further comprising:
receiving, by the relay, a query request from the first blockchain; and
returning, by the relay, the preconfigured management rule set when the query request comprises the first root hash value.

5. The computer-implemented method of claim 2, wherein the first root hash value comprises a hash value formed, based on a preset algorithm, from hash values that respectively correspond to the one or more management rules in the preconfigured management rule set.

6. The computer-implemented method of claim 5, wherein the preset algorithm is used to organize the hash values that respectively correspond to the one or more management rules in the preconfigured management rule set into a hash tree, wherein the first root hash value comprises a root hash value of the hash tree.

7. The computer-implemented method of claim 2, wherein the response result further comprises an identity signature of the relay that is signed on the processed data by using an identity private key of the TEE.

8. The computer-implemented method of claim 1, wherein the response result further comprises information about a monitoring rule hit by the cross-chain data.

9. A computer-implemented system, wherein a trusted execution environment (TEE) is loaded onto the computer-implemented system, and wherein the computer-implemented system comprises:
one or more computers; and
one or more computer memory devices interoperably coupled with the one or more computers and having tangible, non-transitory, machine-readable media storing one or more instructions that, when executed by the one or more computers, perform one or more operations comprising:
obtaining, based on a cross-chain request that is from a first blockchain, cross-chain data from a second blockchain;
obtaining processed data by loading a preconfigured management rule set to process the cross-chain data based on one or more management rules comprised in the preconfigured management rule set;
generating a first root hash value based on the one or more management rules, the first root hash value uniquely corresponding to a root hash value-locking key pair, the root hash value-locking key pair comprising a root hash value-locking private key and a root hash value-locking public key;
generating a response result in response to the cross-chain request, the response result comprising the processed data, the first root hash value, the root hash value-locking public key, and a digital signature generated using the processed data and the root hash value-locking private key; and
returning, to the first blockchain, the response result.

10. The computer-implemented system of claim 9, wherein the response result indicate that the processed data is obtained by managing the cross-chain data based on the preconfigured management rule set.

11. The computer-implemented system of claim 10, wherein the one or more operations further comprise:
receiving a verification request from the first blockchain; and
returning a second root hash value when the verification request comprises the root hash value-locking public key, wherein the second root hash value is compared with the first root hash value that is comprised in the response result.

12. The computer-implemented system of claim 10, wherein the one or more operations further comprise:
receiving a query request from the first blockchain; and
returning the preconfigured management rule set when the query request comprises the first root hash value.

13. The computer-implemented system of claim 10, wherein the first root hash value comprises a hash value formed, based on a preset algorithm, from hash values that respectively correspond to the one or more management rules in the preconfigured management rule set.

14. The computer-implemented system of claim 13, wherein the preset algorithm is used to organize the hash values that respectively correspond to the one or more management rules in the preconfigured management rule set into a hash tree, wherein the first root hash value comprises a root hash value of the hash tree.

15. The computer-implemented system of claim 9, wherein the response result further comprises an identity signature of the computer-implemented system that is signed on the processed data by using an identity private key of the TEE.

16. A non-transitory, computer-readable medium storing one or more instructions executable by a computer system to perform operations comprising:
obtaining, based on a cross-chain request that is from a first blockchain, cross-chain data from a second blockchain, wherein a trusted execution environment (TEE) is loaded onto the computer system;
obtaining processed data by loading a preconfigured management rule set to process the cross-chain data based on one or more management rules comprised in the preconfigured management rule set;
generating a first root hash value based on the one or more management rules, the first root hash value uniquely corresponding to a root hash value-locking key pair, the root hash value-locking key pair comprising a root hash value-locking private key and a root hash value-locking public key;
generating a response result in response to the cross-chain request, the response result comprising the processed data, the first root hash value, the root hash value-locking public key, and a digital signature generated using the processed data and the root hash value-locking private key; and
returning, to the first blockchain, the response result.

17. The non-transitory, computer-readable medium of claim 16, wherein the response result indicate that the processed data is obtained by managing the cross-chain data based on the preconfigured management rule set.

18. The non-transitory, computer-readable medium of claim 17, wherein the operations further comprise:
receiving a verification request from the first blockchain; and returning a second root hash value when the verification request comprises the root hash value-locking public key, wherein the second root hash value is compared with the first root hash value that is comprised in the response result.

19. The non-transitory, computer-readable medium of claim 17, wherein the operations further comprise:
receiving a query request from the first blockchain; and
returning the preconfigured management rule set when the query request comprises the first root hash value.

20. The non-transitory, computer-readable medium of claim 17, wherein the first root hash value comprises a hash value formed, based on a preset algorithm, from hash values that respectively correspond to the one or more management rules in the preconfigured management rule set.

* * * * *